US 9,890,759 B2

(12) United States Patent
Fujimoto et al.

(10) Patent No.: US 9,890,759 B2
(45) Date of Patent: Feb. 13, 2018

(54) CONTROL APPARATUS AND CONTROL METHOD

(71) Applicant: DENSO CORPORATION, Kariya, Aichi-pref. (JP)

(72) Inventors: Hidekazu Fujimoto, Kariya (JP); Satoru Nakayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/301,577

(22) PCT Filed: Apr. 3, 2015

(86) PCT No.: PCT/JP2015/060579
§ 371 (c)(1),
(2) Date: Oct. 3, 2016

(87) PCT Pub. No.: WO2015/156221
PCT Pub. Date: Oct. 15, 2015

(65) Prior Publication Data
US 2017/0114766 A1    Apr. 27, 2017

(30) Foreign Application Priority Data

Apr. 10, 2014  (JP) ................ 2014-080672

(51) Int. Cl.
*F02P 3/05*    (2006.01)
*F02P 5/145*   (2006.01)
*H01F 38/12*   (2006.01)

(52) U.S. Cl.
CPC ............ *F02P 3/05* (2013.01); *F02P 5/145* (2013.01); *H01F 38/12* (2013.01)

(58) Field of Classification Search
CPC ...... F02P 3/05; F02P 5/14; F02P 5/195; H01F 38/12
See application file for complete search history.

(56) References Cited

U.S. PATENT DOCUMENTS

| 4,426,973 A * | 1/1984 | Nakano ................. | F02P 5/1508 123/406.52 |
| 6,629,520 B2 * | 10/2003 | Inagaki ................. | F02P 3/0456 123/618 |

(Continued)

FOREIGN PATENT DOCUMENTS

| JP | 5-180133 | 7/1993 |
| JP | 6-26428 | 2/1994 |
| JP | 2010-101177 | 5/2010 |

*Primary Examiner* — Hieu T Vo
(74) *Attorney, Agent, or Firm* — Nixon & Vanderhye P.C.

(57) ABSTRACT

A discharge control unit causes a high voltage to be generated in a secondary coil by controlling an igniter unit so as to block a flow of current from a primary coil towards a ground side, and controls a spark plug so that electric discharge is formed between electrodes of the spark plug. An energy input control unit controls an energy input unit to input electrical energy to an ignition coil after start of control of the spark plug by the discharge control unit. A normal ignition control unit controls ignition of an air-fuel mixture in a combustion chamber only through control of the spark plug by the discharge control unit. A specific ignition control unit controls the ignition of the air-fuel mixture in the combustion chamber through control of the spark plug by the discharge control unit and through control of the energy input unit by the energy input control unit. A control unit performs ignition control by the specific ignition control unit until a first predetermined period elapses after a start-up condition of an engine is established, and switches to ignition control by the normal ignition control unit after the elapse of the first predetermined period.

14 Claims, 4 Drawing Sheets

(56) References Cited

U.S. PATENT DOCUMENTS 7,392,798 B2 * 7/2008 Wada .................. F02P 3/051
  123/620
2012/0186569 A1 7/2012 Shimakawa et al.

* cited by examiner (A)

(B)

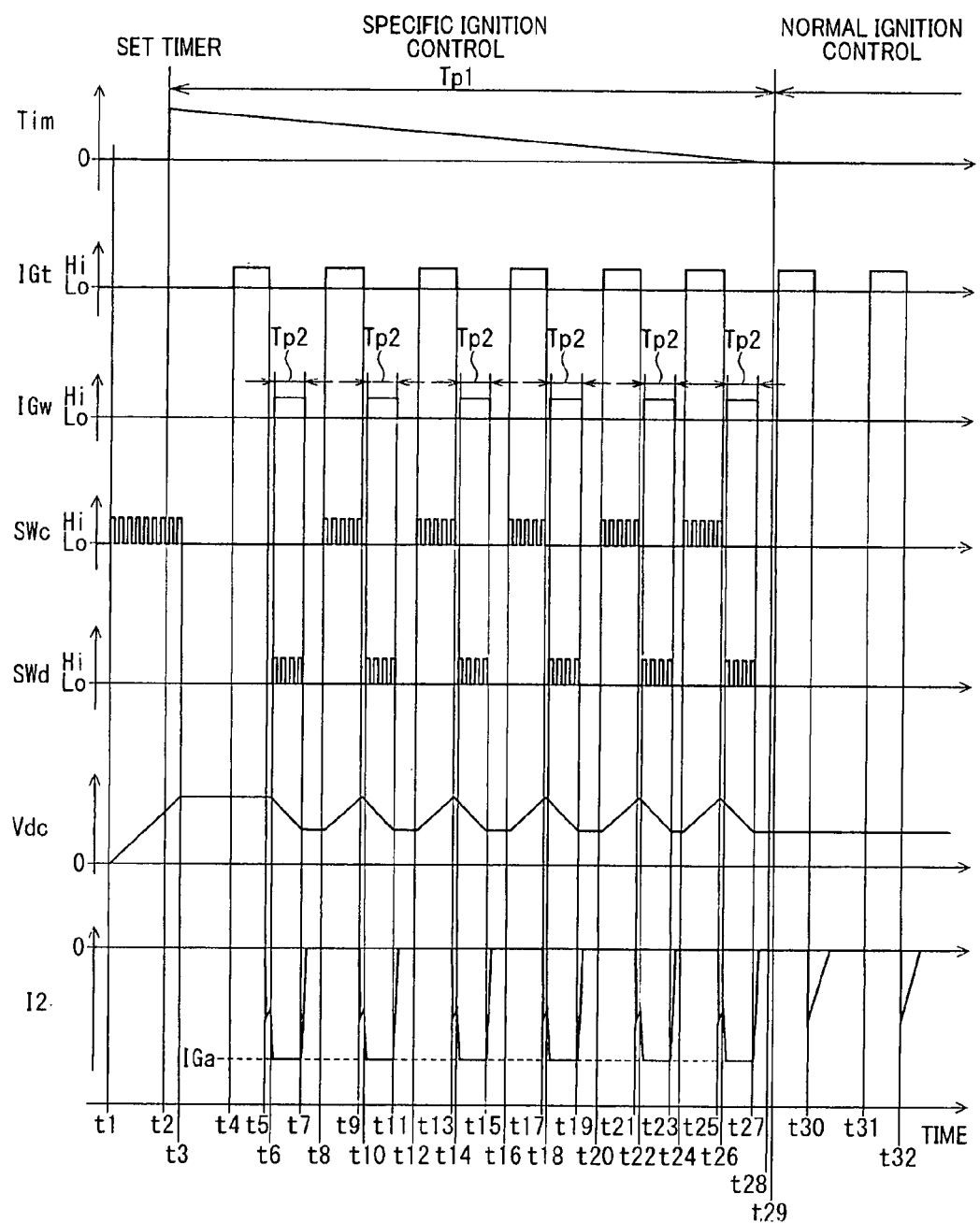

CONTROL APPARATUS AND CONTROL METHOD

CROSS-REFERENCE TO RELATED APPLICATION

This application is a U.S. National Phase Application under 35 U.S.C. 371 of International Application No. PCT/JP2015/060579 filed on Apr. 3, 2015 and published in Japanese as WO 2015/156221 A1 on Oct. 15, 2015. This application is based on and claims the benefit of priority from Japanese Patent Application No. 2014-080672, filed Apr. 10, 2014. The entire disclosures of all of the above applications are incorporated herein by reference.

TECHNICAL FIELD

The present invention relates to a control apparatus and a control method. In particular, the present invention relates to a control apparatus and a control method for controlling an ignition apparatus of an internal combustion engine.

BACKGROUND ART

Conventionally, a control apparatus that controls an ignition apparatus of an internal combustion engine and controls ignition of an air-fuel mixture in a combustion chamber is known. For example, in a control apparatus described in PTL 1, plasma is generated in a combustion chamber, thereby improving ignitability of an air-fuel mixture.

CITATION LIST

Patent Literature

[PTL 1] JP-A-2010-101177

SUMMARY OF INVENTION

Technical Problem

In the control apparatus in PTL 1, plasma is generated in the combustion chamber at start-up of an internal combustion engine. As a result, misfire and incomplete burning in cases in which atomization of fuel is difficult, such as during low temperature immediately after start-up of the internal combustion engine, are suppressed. Stopping of the internal combustion engine and worsening of emission can be suppressed. However, in the control apparatus in PTL 1, a predetermined amount of wait time is required for the plasma to be generated in the combustion chamber. Therefore, start-up of the internal combustion engine may be delayed.

The present invention has been achieved in light of the above-described issues. An object of the present invention is to provide a control apparatus that is capable of improving ignitability of an air-fuel mixture at start-up of an internal combustion engine and starting the internal combustion engine at an early stage.

Solution to Problem

The present invention is a control apparatus that is capable of controlling ignition of an air-fuel mixture in a combustion chamber of an internal combustion engine by controlling an ignition apparatus that includes a spark plug, an ignition coil, an igniter unit, and an energy input unit. The control apparatus includes a control unit. Here, the spark plug is provided in the combustion chamber of the internal combustion engine and is capable of igniting the air-fuel mixture in the combustion chamber by generating electric discharge. The ignition coil has a primary coil of which one end is connected to a power supply side and another end is connected to a ground side, and through which a primary current flows, and a secondary coil of which one end is connected to the spark plug and through which a secondary current flows. The igniter unit is connected to a ground side of the primary coil and is provided to be capable of allowing or blocking the current flowing through the primary coil. The energy input unit is capable of inputting electrical energy to the ignition coil.

The control unit has a discharge control means, an energy input control means, a normal ignition control means, and a specific ignition control means.

The discharge control means causes a high voltage to be generated in the secondary coil by controlling the igniter unit so as to block a flow of current from the primary coil towards the ground side, and controls the spark plug so that electric discharge is formed between electrodes of the spark plug. The air-fuel mixture can be ignited with the electric discharge formed as a result serving as an ignition source.

The energy input control means controls the energy input unit to input electrical energy to the ignition coil after start of control of the spark plug by the discharge control means. As a result, a discharge state of the spark plug occurring as a result of control by the discharge control means can be maintained.

The normal ignition control means controls ignition of the air-fuel mixture in the combustion chamber only through control of the spark plug by the discharge control means.

The specific ignition control means controls the ignition of the air-fuel mixture in the combustion chamber through control of the spark plug by the discharge control means and through control of the energy input unit by the energy input control means. The discharge state of the spark plug can be maintained by the energy input control means when ignition control is performed by the specific ignition control means. Therefore, ignitability of the air-fuel mixture can be improved.

The control unit performs ignition control by the specific ignition control means by performing energy input by the energy input control means until a first predetermined that is a first predetermined period elapses after a start-up condition that is a condition for starting the internal combustion engine is established, and switches to ignition control by the normal ignition control means after the elapse of the first predetermined period. Therefore, ignitability of the air-fuel mixture can be improved until the elapse of a predetermined period (first predetermined period) after start-up of the internal combustion engine. As a result, ignitability of the air-fuel mixture can be improved even in cases in which atomization of fuel is difficult, such as during low temperature immediately after start-up of the internal combustion engine. Misfire and incomplete burning can be suppressed. Therefore, stopping of the internal combustion engine particularly immediately after start-up and worsening of emission can be suppressed.

In addition, in the present invention, wait time is not required when ignition control by the specific ignition control means is performed. Therefore, the internal combustion engine can be started at an early stage.

BRIEF DESCRIPTION OF DRAWINGS

FIG. 4 is a diagram for explaining an operation example of the control apparatus and an ignition apparatus according to the embodiment of the present invention.

DESCRIPTION OF EMBODIMENTS

A control apparatus according to an embodiment of the present invention will hereinafter be described with reference to the drawings.

Figure 1:
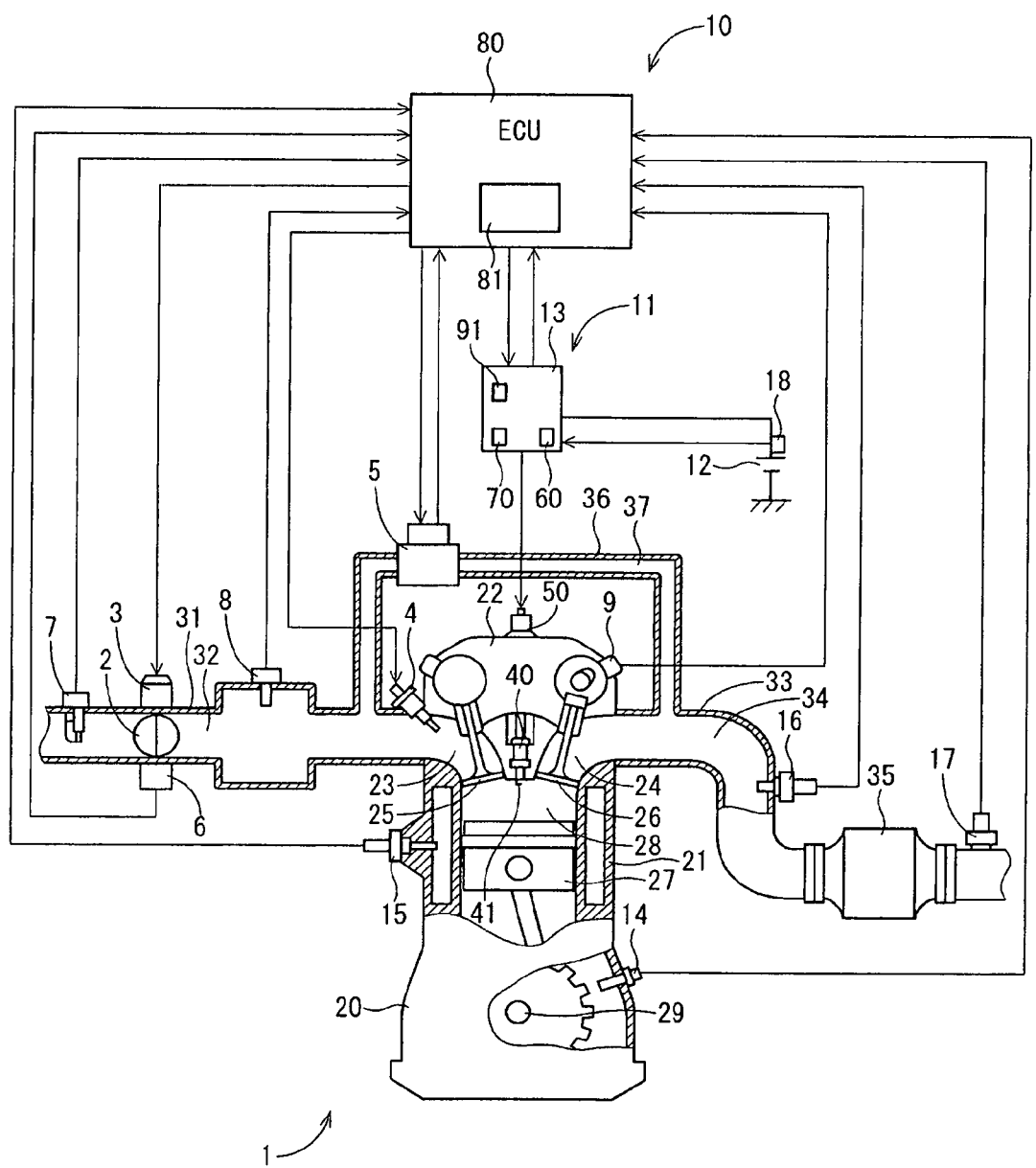
FIG. 1 is a diagram of a control apparatus according to an embodiment of the present invention and an engine system to which the control apparatus is applied.
Figure 2:
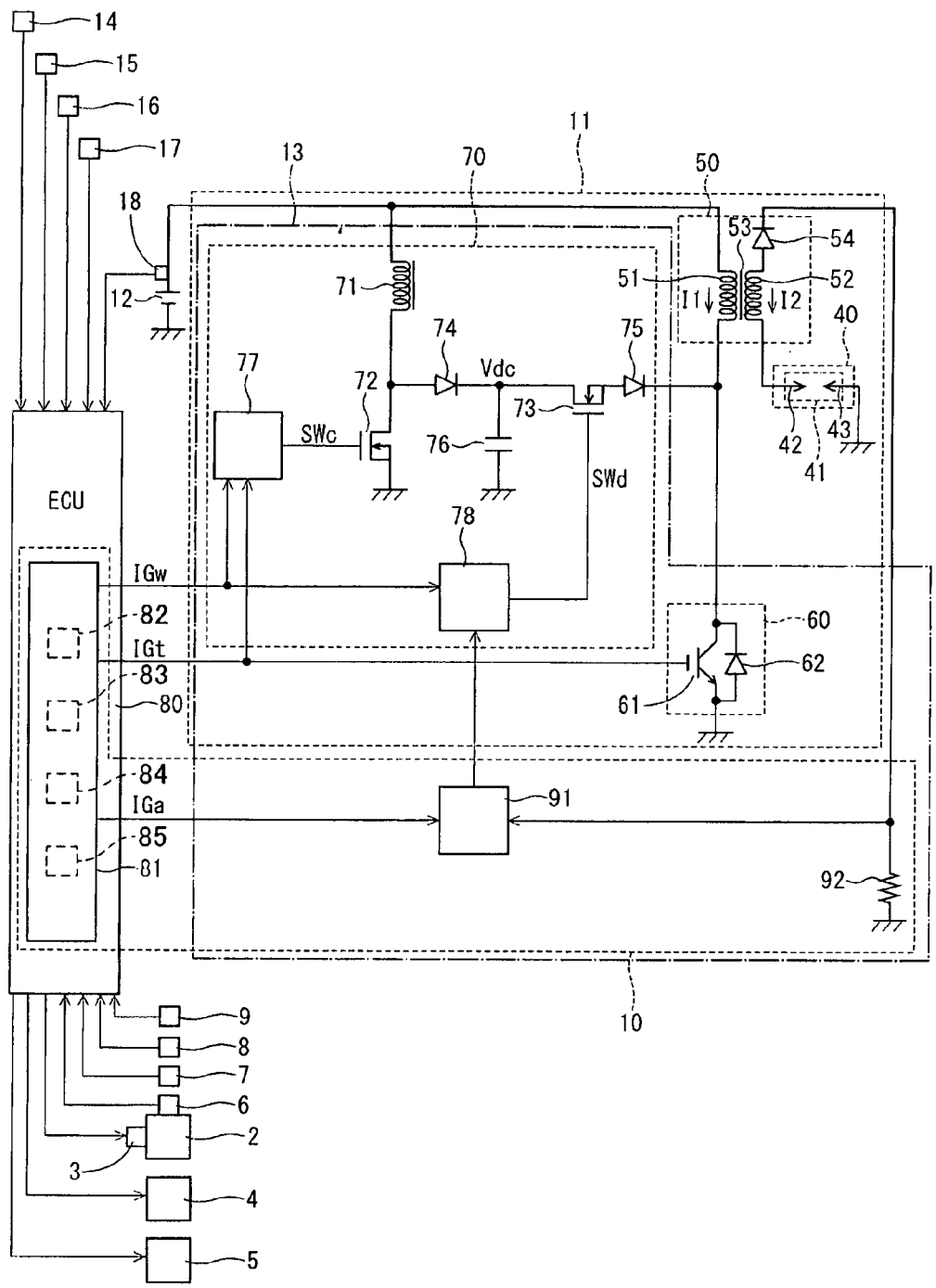
FIG. 2 is a diagram of a circuit configuration of the control apparatus according to the embodiment of the present invention.

The control apparatus according to the embodiment of the present invention is shown in FIGS. 1 and 2. A control apparatus 10 is applied to an engine system 1 and is capable of controlling each section configuring the engine system 1.

The engine system 1 includes an engine 20, an ignition apparatus 11, and the like. The engine 20 serves as an internal combustion engine.

For example, the engine 20 is a pre-mixed combustion-type, four-cylinder engine that is driven using gasoline as fuel. The engine 20 includes a cylinder 21, an engine head 22, an intake valve 25, an exhaust valve 26, a piston 27, a crank shaft 29, and the like.

The cylinder 21 is formed into a cylindrical shape. According to the present embodiment, four cylinders 21 are formed in the engine 20. The engine head 22 is provided so as to seal one end of the cylinder 21. An intake port 23 and an exhaust port 24 that communicate with an interior space of the cylinder 21 are formed in the engine head 22.

The intake valve 25 is provided so as to be capable of opening and closing between the intake port 23 and the interior space of the cylinder 21. The exhaust valve 26 is provided so as to be capable of opening and closing between the exhaust port 24 and the interior space of the cylinder 21.

The piston 27 is provided so as to be capable of reciprocal movement in an axial direction inside the cylinder 21. A combustion chamber 28 is formed by the inner wall of the cylinder 21, the engine head 22, and the piston 27. When a gas composed of a mixture of fuel and air, that is, an air-fuel mixture combusts in the combustion chamber 28, the volume in the combustion chamber 28 increases, and the piston 27 moves towards a side opposite the engine head 22. When the air-fuel mixture combusts in the combustion chamber 28, combustion gas is generated.

The crank shaft 29 is provided so as to be capable of rotating as a result of the reciprocal movement of the piston 27. When the fuel combusts in the combustion chamber 28 and the piston 27 reciprocally moves inside the cylinder 21, the crank shaft 29 rotates, and torque is outputted from the crank shaft 29. The torque outputted from the crank shaft 29 is transmitted to wheels of a vehicle (not shown). The vehicle travels as a result.

An intake pipe 31 is connected to the intake port 23 of the engine head 22. An intake passage 32 is formed inside the intake pipe 31. One end of the intake passage 32 is open to the atmosphere and the other end is connected to the intake port 23. As a result, the atmosphere (air) is supplied to the combustion chamber 28, via the intake passage 32 and the intake port 23. Hereafter, the air supplied from the atmosphere side to the combustion chamber 28 of the engine 20 is referred to as intake air, as appropriate.

A throttle valve 2 is provided in the intake passage 32. The throttle valve 2 is capable of opening and closing the intake passage 32 by being rotatably driven by an actuator 3. That is, the throttle valve 2 is capable of changing the amount of intake air supplied to the combustion chamber 28 by opening and closing the intake passage 32.

A fuel injection valve 4 is provided in the intake pipe 31, near the engine head 22. The fuel injection valve 4 is capable of injecting fuel into the intake port 23. As a result, the air-fuel mixture of fuel and intake air (air) is supplied to the combustion chamber 28. The fuel injection valve 4 is capable of changing the amount of fuel to be injected by opening and closing of a spray hole being controlled. That is, the fuel injection valve 4 is capable of changing the amount of fuel supplied to the combustion chamber 28.

An exhaust pipe 33 is connected to the exhaust port 24 of the engine head 22. An exhaust passage 34 is formed inside the exhaust pipe 33. One end of the exhaust passage 34 is connected to the exhaust port 24, and the other end is open to the atmosphere. As a result, air containing combustion gas generated in the combustion chamber 28 is discharged towards the atmosphere side, via the exhaust port 24 and the exhaust passage 34. Hereafter, the air containing the combustion gas that is discharged from the combustion chamber 28 of the engine 20 is referred to as exhaust gas, as appropriate. According to the present embodiment, a three-way catalyst 35 is provided in the exhaust passage 34. The three-way catalyst 35 cleans the exhaust gas discharged towards the atmosphere side by oxidizing or reducing hydrocarbons, carbon monoxide, and nitrogen oxides in the exhaust gas.

According to the present embodiment, the engine system 1 has an exhaust gas recirculation (EGR) pipe 36 that connects the intake pipe 31 and the exhaust pipe 33. An EGR passage 37 is formed inside the EGR pipe 36. The EGR passage 37 communicates between the exhaust passage 34 and the intake passage 32. As a result, the exhaust gas in the exhaust passage 34 can be recirculated to the intake passage 32, via the EGR passage 37.

An EGR valve apparatus 5 is provided in the EGR pipe 36. The EGR valve apparatus 5 is capable of opening and closing the EGR passage 37 with an EGR valve (not shown). That is, the EGR valve apparatus 5 is capable of changing the amount of exhaust gas recirculated from the exhaust passage 34 to the intake passage 32 by opening and closing the EGR passage 37.

Here, the EGR pipe 36 and the EGR valve apparatus 5 configure an exhaust gas recirculation (EGR) system that re-supplies the combustion chamber 28 with the exhaust gas discharged from the combustion chamber 28 of the engine 20, together with the intake air. As a result of the exhaust gas being re-supplied to the combustion chamber 28 together with the intake air, reduction of nitrogen oxides in the exhaust gas discharged into the atmosphere, improvement in fuel efficiency, and the like can be achieved.

The ignition apparatus 11 is provided to ignite the air-fuel mixture introduced into the combustion chamber 28. As shown in FIG. 2, the ignition apparatus 11 includes a spark plug 40, an ignition coil 50, an igniter unit 60, an energy input unit 70, and the like.

Four spark plugs 40 are provided to respectively correspond to the four cylinders 21. The spark plug 40 has a discharging portion 41. The discharging portion 41 has a center electrode 42 and a ground electrode 43. The center electrode 42 and the ground electrode 43 form a predetermined gap therebetween. The spark plug 40 is provided in the engine head 22 such that the discharging portion 41 is exposed in the combustion chamber 28 (see FIG. 1). The ground electrode 43 is electrically connected to the engine head 22. That is, the ground electrode 43 is grounded. The spark plug 40 is capable of igniting the air-fuel mixture in the combustion chamber 28 by generating electric discharge between the center electrode 42 and the ground electrode 43 of the discharging portion 41 by a voltage that is applied.

Four ignition coils 50 are provided to respectively correspond to the four spark plugs 40 (cylinders 21). The ignition coil 50 is provided in the engine head 22 such that one end of the ignition coil 50 is connected to the spark plug 40 on the side opposite the discharging portion 41 (see FIG. 1). The ignition coil 50 has a primary coil 51, a secondary coil 52, a core 53, and a diode 54 (see FIG. 2).

For example, the primary coil 51 is formed by a copper wire being wound around the core 53, a predetermined number of times. One end of the primary coil 51 is connected to a positive terminal of a power supply 12. The power supply 12 is a low-voltage battery that is capable of outputting a voltage of about 10 to 19 volts from the positive terminal. A negative terminal is grounded (body earth). The other end of the primary coil 51 is the side that is grounded.

For example, the secondary coil 52 is formed by a copper wire being wound around the core 53, a predetermined number of times. One end of the secondary coil 52 is connected to the center electrode 42 of the spark plug 40, and the other end is grounded via a diode or the like. Here, the number of times the secondary coil 52 is wound is set to be greater than that of the primary coil 51.

The core 35 is composed of a material having a magnetic permeability of a predetermined value or greater, such as iron.

The diode 54 is provided on the side of the secondary coil 52 opposite the spark plug 40. The diode 54 is provided such that an anode side is connected to the secondary coil 52 and a cathode side is connected to the ground side. As a result, a flow of current from the secondary coil 52 towards the ground side, via the diode 54, is allowed. A flow of current from the ground side towards the secondary coil 52 side, via the diode 54, is blocked.

Four igniter units 60 are provided to respectively correspond to the four ignition coils 50 (cylinders 21). The igniter unit 60 is provided on the side of the primary coil 51 of the ignition coil 50 opposite the power supply 12 (see FIG. 2). The igniter unit 60 has a switching element 61 and a diode 62.

According to the present embodiment, for example, the switching element 61 is an insulated gate bipolar transistor (IGBT). The switching element 61 is provided such that a collector is connected to the primary coil 51 and an emitter is grounded. The switching element 61 performs a switching operation to be set to an ON state or an OFF state, based on a signal inputted to a gate. In the ON state, the switching element 61 allows a flow of current from the primary coil 51 towards the ground side, via the switching element 61. In the OFF state, the switching element 61 blocks the flow of current from the primary coil 51 towards the ground side, via the switching element 61.

An anode side of the diode 62 is connected to the emitter of the switching element 61, or in other words, grounded. A cathode side of the diode 62 is connected to the collector of the switching element 61, or in other words, connected to the primary coil 51. As a result, a flow of current from the ground side towards the primary coil 51 side, via the diode 62, is allowed. A flow of current from the primary coil 51 side towards the ground side, via the diode 62, is blocked.

When the switching element 61 of the igniter unit 60 is in the ON state, the current from the power supply 12 flows towards the ground side, via the primary coil 51 of the ignition coil 50 and the switching element 61. At this time, the core 53 is magnetized and accumulates magnetic energy. A magnetic field is formed around the core 53. When the switching element 61 is set to the OFF state while the current is flowing through the primary coil 51, the flow of current from the primary coil 51 towards the ground side is blocked. The magnetic field around the core 53 changes, and a voltage of about several hundred volts is generated in the primary coil 51 as a result of self-induction. At this time, a high voltage of about several tens of kilovolts is also generated in the secondary coil 52 that shares a magnetic circuit and magnetic flux. At this time, the voltage generated in the secondary coil 52 is of a magnitude proportional to the numbers of turns of the primary coil 51 and the secondary coil 52. When a high voltage is generated in the secondary coil 52, a potential difference between the center electrode 42 and the ground electrode 43 of the spark plug 40 becomes a predetermined value or more. As a result, insulation breakdown occurs between the center electrode 42 and the ground electrode 43. The spark plug 40 generates electric discharge between the center electrode 42 and the ground electrode 43.

Hereafter, the current flowing to the primary coil 51 is referred to as a primary current I1, the current flowing to the secondary coil 52 is referred to as a secondary current I2, and the voltage of the second coil 52 is referred to as a secondary voltage V2, as appropriate. In addition, a direction from the power supply 12 side towards the igniter unit 60 side is a positive direction of the primary current I1, and a direction from the diode 54 side towards the spark plug 40 side is a positive direction of the secondary current I2. Furthermore, the secondary voltage V2 when the positive-direction secondary current I2 flows to the secondary coil 52 is a positive voltage.

According to the present embodiment, when the spark plug 40 generates electric discharge, the secondary voltage V2 is a negative voltage. During electric discharge, a negative-direction secondary current I2 flows to the secondary coil 52.

According to the present embodiment, a single energy input unit 70 is provided for the four ignition coils 50. The energy input unit 70 is provided in parallel to the primary coil 51 between the power supply 12 and the igniter unit 60 (see FIG. 2). The energy input unit 70 has a coil 71, switching elements 72 and 73, diodes 74 and 75, a capacitor 76, and driver circuits 77 and 78.

For example, the coil 71 is formed by a copper wire being wound a predetermined number of time's. The coil 71 is provided such that one end is connected between the power supply 12 and the primary coil 51.

According to the present embodiment, the switching elements 72 and 73 are metal-oxide-semiconductor field-effect transistors (MOSFETs), which are a type of field-effect transistors. The switching element 72 is provided such that a drain is connected to the other end of the coil 71, and a source is grounded. The switching element 73 is provided such that a drain is connected between the coil 71 and the switching element 72, and a source is connected between the primary coil 51 of the ignition coil 50 and the igniter unit 60. According to the present embodiment, four switching elements 73 are provided to respectively correspond to the four ignition coils 50 (cylinders 21). However, the present invention is not limited thereto.

The switching elements 72 and 73 each perform a switching operation so as to be set to an ON state or an OFF state, based on a signal inputted to a gate. In the ON state, the switching element 72 allows a flow of current from the coil 71 towards the ground side, via the switching element 72. In the OFF state, the switching element 72 blocks the flow of current from the coil 71 towards the ground side, via the switching element 72. In the ON state, the switching element 73 allows a flow of current from the coil 71 and switching element 72 side towards the primary coil 51 and igniter unit 60 side, via the switching element 73. In the OFF state, the switching element 73 blocks the flow of current from the coil 71 and switching element 72 side towards the primary coil 51 and igniter unit 60 side, via the switching element 73.

The diode 74 is provided such that an anode side is connected between the coil 71 and the switching 72, and a cathode side is connected to a drain of the switching element 73. As a result, a flow of current from the coil 71 and switching element 72 side towards the switching element 73 side, via the diode 74, is allowed. A flow of current from the switching element 73 side towards the coil 71 and switching element 72 side, via the diode 74, is blocked.

The diode 75 is provided such that an anode side is connected to a source of the switching element 73 and a cathode side is connected between the primary coil 51 and the igniter unit 60. As a result, a flow of current from the switching element 73 side towards the primary coil 51 and igniter unit 60 side, via the diode 75, is allowed. A flow of current from the primary coil 51 and igniter unit 60 side towards the switching element 73 side, via the diode 75, is blocked. According to the present embodiment, four diodes 75 are provided to respectively correspond to the four switching elements 73.

The capacitor 76 is provided such that one end is connected between the diode 74 and the switching element 73, and the other end is grounded.

The driver circuit 77 generates a switching signal SWc related to the switching operation of the switching element 72, based on an inputted signal. The driver circuit 77 then outputs the generated switching signal SWc to the gate of the switching element 72. Here, the switching signal SWc is a signal indicating OFF (Lo) or ON (Hi). When the switching signal SWc is OFF, the switching element 72 is set to the OFF state. When the switching signal SWc is ON, the switching element 72 is set to the ON state. In this way, the switching element 72 performs the switching operation based on the switching signal SWc inputted from the driver circuit 77.

The driver circuit 78 generates a switching signal SWd related to the switching operation of the switching element 73, based on an inputted signal. The driver circuit 78 then outputs the generated switching signal SWd to the gate of the switching element 73. Here, the switching signal SWd is a signal indicating OFF (Lo) or ON (Hi). When the switching signal SWd is OFF, the switching element 73 is set to the OFF state. When the switching signal SWd is ON, the switching element 73 is set to the ON state. In this way, the switching element 73 performs the switching operation based on the switching signal SWd inputted from the driver circuit 78. According to the present embodiment, four driver circuits 78 are provided to respectively correspond to the four switching elements 73.

When the switching element 73 is in the OFF state and the switching element 72 is in the ON state, the current from the power supply 12 flows towards the ground side, via the coil 71 and the switching element 72. At this time, magnetic energy is stored in the coil 71. When the switching element 72 is set to the OFF state while the current is flowing through the coil 71, the flow of current from the coil 71 towards the ground side is blocked. As a result, electrical energy is discharged from the coil 71. The electrical energy is supplied to the capacitor 76 via the diode 74.

Therefore, when the switching element 72 performs a switching operation so as to repeatedly alternate between the ON state and the OFF state while the switching element 73 is in the OFF state, the electrical energy is gradually accumulated in the capacitor 76 from the coil 71. At this time, a voltage Vdc on one end side of the capacitor 76 gradually increases. When the switching element 73 is set to the ON state in a state in which the electrical energy is accumulated in the capacitor 76 and the switching element 61 of the igniter unit 60 is in the OFF state, the electrical energy of the capacitor 76 is supplied (inputted) to the primary coil 51 of the corresponding ignition coil 50, via the switching element 73 and the diode 75. In this way, the energy input unit 70 is capable of accumulating electrical energy from the power supply 12 in the capacitor 76, and inputting the electrical energy to the ignition coil 50.

According to the present embodiment, the energy input unit 70 inputs electrical energy to the ignition coil 50 such that the polarity is the same as that of the secondary current I2 flowing to the secondary coil 52 when the spark plug 40 generates electric discharge, that is, such that the negative-direction secondary current I2 is superimposed.

According to the present embodiment, the above-described igniter unit 60 and energy input unit 70 are housed in a housing of an ignition circuit unit 13 (see FIG. 2).

As shown in FIG. 2, the control apparatus 10 includes a control unit 81, a current detection circuit 91, and the like.

According to the present embodiment, the control unit 81 is housed in a housing of an electronic control unit (referred to, hereafter, as an ECU) 80.

For example, the control unit 81 is a microcomputer. The control unit 81 has a central processing unit (CPU) that serves as a calculating means, a read-only memory (ROM) and a random access memory (RAM) that serve as a storage means, a timer that serves as a time measuring means, an input/output (I/O) that serves as an input/output means, and the like. The control unit 81 is capable of integrally controlling the vehicle by performing calculations based on a program stored in the ROM, based on signals from sensors provided in each section of the vehicle and the like, and controlling operation of apparatuses and equipment in each section of the vehicle.

As shown in FIG. 1, according to the present embodiment, a throttle position sensor 6 is provided near the throttle valve 2 of the intake pipe 31. The throttle position sensor 6 detects the degree of opening of the throttle valve 6 on the intake passage 32, and outputs a signal correlated to the detected degree of opening to the control unit 81. As a result, the control unit 81 can detect the degree of opening of the throttle valve 2.

In addition, an airflow meter 7 is provided on the side of the throttle valve 2 in the intake pipe 31 opposite the engine 20. The airflow meter 7 detects the amount of intake air flowing through the intake passage 32, that is, the amount of intake air supplied to the combustion chamber 28 of the engine 20. The airflow meter 7 then outputs a signal correlated to the detected amount of intake air to the control unit 81. As a result, the control unit 81 can detect the amount of intake air supplied to the combustion chamber 28.

In addition, an intake pressure sensor 8 is provided in a surge tank between the throttle valve 2 in the intake pipe 31 and the engine 20. The intake pressure sensor 8 detects the pressure (intake pressure) of the intake air flowing through the intake passage 32, and outputs a signal correlated to the detected pressure to the control unit 81. As a result, the control unit 81 can detect the intake pressure.

In addition, a cam position sensor 9 is provided near a cam shaft of the engine head 22. The cam position sensor 9 detects a rotation position of the cam shaft that drives the discharge valve 26 or the intake valve 25 so as to open and close. The cam position sensor 9 then outputs a signal correlated to the detected rotation position to the control unit 81. As a result, the control unit 81 can detect the rotation position of the cam shaft. Consequently, the control unit 81 can perform calculation of a cam angle, cylinder differentiation, and the like.

In addition, the engine 20 is provided with a crank position sensor 14 near the crank shaft 29. The crank position sensor 14 detects a rotation position of the crank shaft 29 and outputs a signal correlated to the detected rotation position to the control unit 81. As a result, the control unit 81 can detect the rotation position of the crank shaft 29. Consequently, the control unit 81 can perform calculation of a crank angle, calculation of a rotation speed of the crank shaft 29, that is, the rotation speed of the engine 20, and the like.

In addition, in the engine 20, a water temperature sensor 15 is provided in the cylinder 21. The water temperature sensor 15 detects the temperature (water temperature) of a coolant that cools the cylinder 21, and outputs a signal correlated to the detected temperature to the control unit 81. As a result, the control unit 81 can detect the temperature of the coolant.

In addition, an air/fuel (A/F) sensor 16 is provided in the exhaust pipe 33 between the engine 20 and the three-way catalyst 35. The A/F sensor 16 detects the air-fuel ratio inside the engine 20, based on the oxygen concentration and the unburnt gas concentration in the exhaust gas flowing through the exhaust passage 34. The A/F sensor 16 then outputs a signal correlated to the detected air-fuel ratio to the control unit 81. As a result, the control unit 81 can detect the air-fuel ratio inside the engine 20.

In addition, an $O_2$ sensor 17 is provided on the side of the three-way catalyst 35 in the exhaust pipe 33 opposite the engine 20. The $O_2$ sensor 17 detects whether the air-fuel ratio inside the engine 20 is in a rich state or a lean state in relation to a theoretical air-fuel ratio (stoichiometry), based on electromotive force generated due to the difference between the oxygen concentration in the atmosphere and the oxygen concentration in the exhaust gas flowing through the exhaust passage 34. The 02 sensor 17 then outputs a signal (rich signal or lean signal) corresponding to the detected state to the control unit 81. As a result, the control unit 81 can detect whether the air-fuel ratio inside the engine 20 is in a rich state or a lean state in relation to the theoretical air-fuel ratio.

In addition, a voltage sensor 18 is provided in the power supply 12. The voltage sensor 18 detects the voltage of the power supply 12 and outputs a signal correlated to the detected voltage to the control unit 81. As a result, the control unit 81 is capable of detecting the voltage of the power supply 12.

The EGR valve apparatus 5 outputs a signal correlated to the degree of opening of the EGR valve in the EGR passage 37, to the control unit 81. As a result, the control unit 81 is capable of detecting the degree of opening of the EGR valve.

The control unit 81 can control the operation of the engine 20 by controlling the operations of the ignition apparatus 11 including the spark plug 40 and the ignition coil 50, the actuator 3 of the throttle valve 2, the fuel injection valve 4, the EGR valve apparatus 5, and the like, based on the signals from the various sensors described above.

According to the present embodiment, the current detection circuit 91 is housed in a housing of the ignition circuit unit 13 (see FIG. 2). The ignition circuit unit 13 is provided with a resistor 92. The resistor 92 is provided such that one end is connected to the cathode side of the diode 54 of the ignition coil 50 and the other end is grounded. The current detection circuit 91 is provided so as to be connected between the diode 54 and the resistor 92. As a result, the current detection circuit 91 is capable of detecting the current flowing from the diode 54 towards the ground side, that is, the secondary current I2 flowing through the secondary coil 52.

Next, control of the ignition apparatus 11 by the control unit 81 and ignition control of the air-fuel mixture in the combustion chamber 28 will be described.

The control unit 81 controls the igniter unit 60 so as to block the flow of current from the primary coil 51 towards the ground side, thereby generating a high voltage in the secondary coil 52. The control unit 81 thereby controls the spark plug 40 such that the spark plug 40 generates electric discharge. Specifically, the control unit 81 controls the spark plug 40 by outputting an ignition signal IGt to the gate of the switching element 61 of the igniter unit 60. Here, the ignition signal IGt is a signal indicating OFF (Lo) or ON (Hi). When the ignition signal IGt is OFF, the switching element 61 is set to the OFF state. The flow of current (primary current I1) from the primary coil 51 towards the ground side, via the switching element 61, is blocked. Meanwhile, when the ignition signal IGt is ON, the switching element 61 is set to the ON state. The flow of current from the primary coil 51 towards the ground side, via the switching element 61, is allowed.

When the ignition signal IGt changes from ON to OFF, the flow of the primary current I1 flowing through the primary coil 51 is blocked and a high voltage is generated in the secondary coil 52. As a result, the spark plug 40 generates electric discharge between the center electrode 42 and the ground electrode 43 of the discharging portion 41. As a result, the air-fuel mixture in the combustion chamber 28 is ignited (ignited).

In this way, the control unit 81 generates the ignition signal IGt and outputs the ignition signal IGt to the switching element 61 of the igniter unit 60. As a result, the control unit 81 is capable of controlling the spark plug 40 so as to generate electric discharge at a timing at which the ignition signal IGt falls from ON to OFF. According to the present embodiment, the control unit 81 has a discharge control unit 82 (corresponding to a discharge control mean) that performs the above-described control. The timing at which the ignition signal IGt falls from ON to OFF is a control start time (start of a control period) of the spark plug 40 by the discharge control unit 82.

In addition, after the start of control of the spark plug 40 by the discharge control unit 82, the control unit 81 controls the energy input unit 70 to input electrical energy to the ignition coil 50. Specifically, the control unit 81 controls the energy input unit 70 by controlling the switching element 73 by outputting an energy input period signal IGw to the driver circuit 78. Here, the energy input period signal IGw is a signal indicating OFF (Lo) or ON (Hi). The energy input period signal IGw is generated so as to rise from OFF to ON after the ignition signal IGt has fallen from ON to OFF, that is, after the start of control of the spark plug 40 by the discharge control unit 82.

The driver circuit 78 outputs the switching signal SWd to the gate of the switching element 73 during the period over which the energy input period signal IGw is ON. As a result, during the period over which the energy input period signal IGw is ON, the switching element 73 performs a switching operation so as to be in the ON state or the OFF state.

When the switching element 73 is in the ON state, the electrical energy accumulated in the capacitor 76 is inputted to the ground side of the primary coil 51 of the ignition coil 50, via the switching element 73 and the diode 75. According to the present embodiment, the control unit 81 has an energy input control unit 83 (corresponding to an energy input control means) that performs the above-described control.

When the energy input control unit 83 controls the energy input unit 70 and the electrical energy is inputted to the ground side of the primary coil 51 of the ignition coil 50, induced current is generated in the secondary coil 52 of the ignition coil 50. The induced current corresponds to electrical energy enabling the discharge state of the spark plug 40 generated by control performed by the discharge control unit 82 to be maintained. That is, the energy input unit 70 can also be considered to input electrical energy to the spark plug 40.

According to the present embodiment, a value of the secondary current I2 detected by the current detection circuit 91 is fed back by the energy input control unit 83. Thus, the energy input control unit 83 controls the energy input unit 70 by, for example, controlling a duty ratio of the switching signal SWd (a ratio of the ON period in relation to the switching cycle) so that a current corresponding to a target current value IGa flows through the secondary coil 52. The target current value IGa is a predetermined current value. Consequently, the secondary current I2 substantially corresponding to the target current value IGa flows through the secondary coil 52 during the period over which the energy input unit 70 inputs electrical energy to the ignition coil 50.

The control unit 81 accumulates electrical energy in the capacitor 76 by controlling the switching element 72 via the driver circuit 77 before the energy input control unit 83 inputs electrical energy to the ignition coil 50. Specifically, the driver circuit 77 outputs the switching signal SWc to the gate of the switching element 72 before the energy input period signal IGw is set to ON, such as during the period over which the ignition signal IGt is ON. Consequently, the switching element 72 performs the switching operation so as to be set to the ON state or the OFF state during the period over which the ignition signal IGt is ON, for example. As a result, electrical energy is accumulated in the capacitor 76.

According to the present embodiment, the control unit 81 has a normal ignition control unit 84 (corresponding to a normal ignition control means) that controls ignition of the air-fuel mixture in the combustion chamber 28 only through control of the spark plug 40 by the discharge control unit 82. In ignition control of the air-fuel mixture by the normal ignition control unit 84, the input of electrical energy to the ignition coil 50 by the energy input unit 70 is not performed. Consequently, electric discharge by the spark plug 40 is completed in a relatively short amount of time. Therefore, ignition control of the air-fuel mixture by the normal ignition control unit 84 is suitable for when the air-fuel mixture in the combustion chamber 28 is in an easily ignitable (ignitable) state.

In addition, the control unit 81 has a specific ignition control unit 85 (corresponding to a specific ignition control means) that controls ignition of the air-fuel mixture in the combustion chamber 28 through control of the spark plug 40 by the discharge control unit 82 and control of the energy input unit 70 by the energy input control unit 83. In ignition control of the air-fuel mixture by the specific ignition control unit 85, the input of electrical energy to the ignition coil 50 by the energy input unit 70 is performed. Consequently, electric discharge by the spark plug 40 continues over a relatively long amount of time. Therefore, ignition control of the air-fuel mixture by the specific ignition control unit 85 is suitable for when the air-fuel mixture in the combustion chamber 28 is a difficult-to-ignite (ignite) state.

According to the present embodiment, the control unit 81 performs ignition control (including energy input control) by the specific ignition control unit 85 until the elapse of a first predetermined period Tp1, which is a first predetermined period, after a start-up condition that is a condition for starting the engine 20 is established, such as when an engine start-up request is issued by a driver of the vehicle, when an engine start-up request is issued by equipment or the like mounted in the vehicle, or when an engine restart request is issued after idling stop. When the first predetermined period Tp1 elapses, the control unit 81 switches to ignition control by the normal ignition control unit 84.

In addition, in ignition control by the specific ignition control unit 85, the energy input control unit 83 controls the energy input unit 70 so as to input electrical energy to the ignition coil 50 over a second predetermined period Tp2, which is a second predetermined period, after the start of control of the spark plug 40 by the discharge control unit 82.

Figure 3:
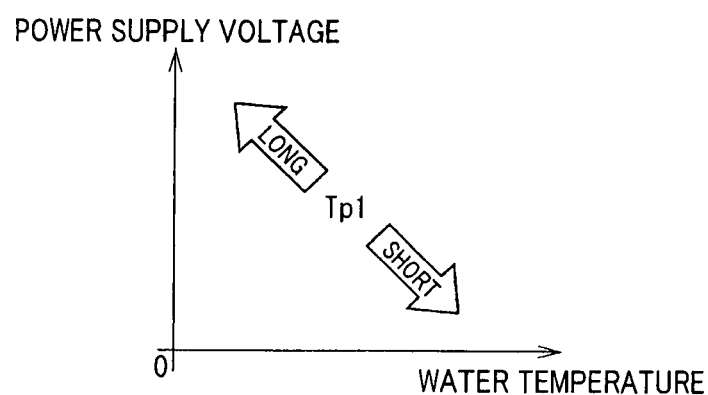
FIG. 3 is diagrams for explaining a manner in which a first predetermined period and a second predetermined period are set in the control apparatus according to the embodiment of the present invention, in which (A) is a diagram of a relationship between the first predetermined period to be set, and power supply voltage and water temperature, and (B) is a diagram of a relationship between the second predetermined period to be set, and engine rotation speed and water temperature.
Figure 3:
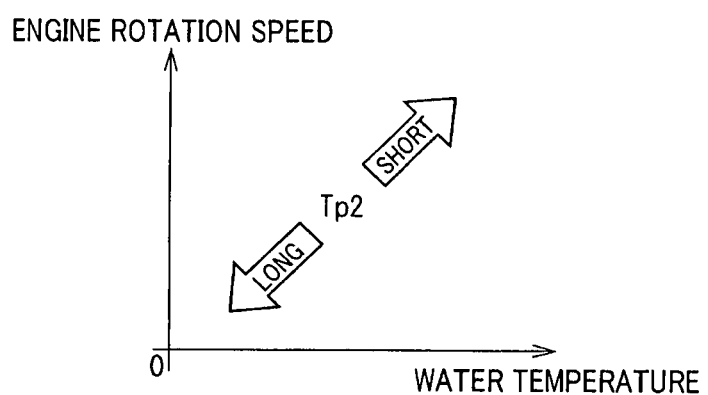

Next, the manner in which the control unit 81 sets the first predetermined period Tp1 and the second predetermined period Tp2 will be described with reference to FIG. 3.

The control unit 81 sets the first predetermined period Tp1 based on, for example, the temperature (water temperature) of the coolant detected by the water temperature sensor 15 and the voltage (power supply voltage) of the power supply 12 detected by the voltage sensor 18 when the start-up condition for the engine 20 is established. For example, the control unit 81 sets the first predetermined period Tp1 to be a longer period as the detected water temperature decreases and the power supply voltage increases, and sets the first predetermined period Tp1 to be a shorter period as the detected water temperature increases and the power supply voltage decreases (see FIG. 3(A)).

The control unit 81 sets the second predetermined period Tp2 based on, for example, the temperature (water temperature) of the coolant detected by the water temperature sensor 15 and the rotation speed (engine rotation speed) of the engine 20 calculated based on the rotation position of the crank shaft 29 detected by the crank position sensor 14, when the start-up condition for the engine 20 is established. For example, the control unit 81 sets the second predetermined period Tp2 to be a longer period as the detected water temperature decreases and the calculated engine rotation speed decreases, and sets the second predetermined period Tp2 to be a shorter period as the detected water temperature increases and the calculated engine rotation speed increases (see FIG. 3(B)).

According to the present embodiment, as a result of the control unit 81 setting the first predetermined period Tp1 and the second predetermined period Tp2 as described above, the period (first predetermined period Tp1) of ignition control by the specific ignition control unit 85 at engine start-up becomes longer as the water temperature decreases and the power supply voltage increases. The input period (second predetermined period Tp2, the ON period of the energy input period signal IGw) of electrical energy to the ignition coil 50 by the energy input control unit 83 becomes longer as the water temperature decreases and the engine rotation speed decreases.

Next, an operation example of the control apparatus 10 and the ignition apparatus 11 controlled by the control apparatus will be described with reference to FIG. 4.

When an ignition key is turned ON at time t1, the driver circuit 77 of the energy input unit 70 outputs the switching signal that changes to ON or OFF to the switching element 72. Therefore, the switching element 72 performs a switching operation so as to be set to the ON state or the OFF state. As a result, electrical energy is accumulated in the capacitor 76. When the driver circuit 77 outputs the switching signal SWc that changes to ON or OFF to the switching element 72 over a period from time t1 to 3, the voltage Vdc on one end side of the capacitor 76 rises.

When the start-up condition for the engine 20 is established at time t2, the control unit 81 sets the first predetermined period Tp1 based on the current water temperature and power supply voltage, and sets the second predetermined period Tp2 based on the current water temperature and engine rotation speed. Specifically, the control unit 81 sets a timer value Tim to a value corresponding to Tp1. After time t2, the control unit 81 subtracts from the timer value Tim per unit time. Here, when the timer value Tim is greater than zero, the control unit 81 performs ignition control by the specific ignition control unit 85. Therefore, until the timer value Tim reaches zero, that is, until the first predetermined period Tp1 elapses from time t2, the control unit 81 performs ignition control by the specific ignition control unit 85.

When the control unit 81 determines that conduction to the first coil 51 of the ignition coil 50 should be started at time t4, the ignition signal IGt is set to ON. As a result, conduction (primary current I1) to the primary coil 51 is started.

When the control unit 81 determines that the timing is such that the air-fuel mixture should be ignited at time t5, the ignition signal IGt is set to OFF. As a result, the secondary voltage V2 that is a negative voltage is generated in the secondary coil 52. An absolute value of the secondary voltage V2 reaches a predetermined value or greater, and the spark plug 40 generates electric discharge between the center electrode 42 and the ground electrode 43 of the discharging portion 41. As a result, the air-fuel mixture in the combustion chamber 28 is ignited (ignited). At this time, the negative-direction secondary current I2 flows to the secondary coil 52. An absolute value of the secondary current I2 becomes a predetermined value or greater. When the spark plug 40 generates electric discharge at time t5, in accompaniment, the absolute value of the secondary voltage V2 promptly becomes the predetermined value or less. In addition, in accompaniment with the electric discharge by the spark plug 40, the absolute value of the secondary current I2 gradually decreases over a period from time t5 to 6.

When the control unit 81 sets the energy input period signal IGw to ON at time t6, the driver circuit 78 of the energy input unit 70 outputs the switching signal SWd that changes to ON or OFF to the switching element 73. As a result, the input of electrical energy to the ignition coil 50 by the energy input unit 70 is started. The switching element 73 performs a switching operation so as to be set to the ON state or the OFF state during a period over which the energy input period signal IGw is ON (time t6 to 7, second predetermined period Tp2). Therefore, the energy input unit 70 inputs electrical energy to the ignition coil 50 during the period from time t6 to 7. Consequently, the secondary current I2 that has the same polarity as that of the secondary current I2 that flows to the secondary coil 52 when the spark plug 40 generates electric discharge, that is, the negative-direction secondary current I2 is superimposed. As a result, the discharge state of the spark plug 40 that occurs at time t5 is maintained. At this time (time t6 to 7), the voltage Vdc on one end side of the capacitor 76 decreases.

When the input of electrical energy to the ignition coil 50 is stopped at time t7, electric discharge by the spark plug 40 is stopped (the discharge state is cancelled).

According to the present embodiment, the energy input control unit 83 gives feedback of the value of the secondary coil 12 detected by the current detection circuit 91, thereby controlling the energy input unit 70 such that a current corresponding to the target current value IGa flows to the secondary coil 52. As a result, as shown in FIG. 4, during the period (time t6 to t7) over which the energy input period signal IGw is ON, the secondary current I2 (of which an average value is IGa) substantially corresponding to the target current value IGa flows to the secondary coil 52.

When the control unit 81 determines that conduction to the primary coil 51 of the ignition coil 50 should be started at time t8, the ignition signal IGt is set to ON. As a result, conduction (primary current I1) to the primary coil 51 is started. In addition, the driver circuit 77 of the energy input unit 70 outputs the switching signal SWc that changes to ON or OFF to the switching element 72, during the period over which the ignition signal IGt is ON (time t8 to 9). As a result, during the period from time t8 to 9, electrical energy is accumulated in the capacitor 76.

Operations during a period from time t10 to 11, a period from time t14 to 15, a period from time t18 to 19, a period from time t22 to 23, and a period from time t26 to 27 are similar to the operation during the period from time t6 to 7, described above. Therefore, descriptions thereof are omitted.

In addition, operations during a period from time t12 to 13, a period from time t16 to 17, a period from tome t20 to 21, and a period from time t24 to 25 are similar to the operation during the period from time t8 to 9, described above. Therefore, descriptions thereof are omitted.

When the timer value Tim reaches zero at time t28, that is, when the first predetermined period Tp1 elapses from time t2 at which the start-up condition for the engine 20 is established, the control unit 81 switches to ignition control by the normal ignition control unit 84. Therefore, after time t28, the control unit 81 performs ignition control by the normal ignition control unit 84.

When the control unit 81 determines that conduction to the primary coil 51 of the ignition coil 50 should be started at time t29, the ignition signal IGt is set to ON. As a result, conduction (primary current I1) to the primary coil 51 is started.

When the control unit 81 determines that the timing is such that the air-fuel mixture should be ignited at time t30, the ignition signal IGt is set to OFF. As a result, the absolute value of the secondary voltage V2 that is generated in the secondary coil 52 becomes a predetermined value or greater. The spark plug 40 generates electric discharge between the center electrode 42 and the ground electrode 43 of the discharging portion 41. As a result, the air-fuel mixture in the combustion chamber 28 is ignited (ignited). At this time, the absolute value of the current (secondary current I2)

flowing to the secondary coil 52 becomes a predetermined value or greater. When the spark plug 40 generates electric discharge at time t30, in accompaniment, the absolute value of the secondary voltage V2 promptly becomes the predetermined value or less. In addition, in accompaniment with the electric discharge by the spark plug 40, after time t30, the absolute value of the secondary current I2 gradually decreases.

Operations at t31 and 32 are similar to the operations at time t29 and 30, described above. Therefore, descriptions thereof are omitted.

After time t32, the control unit 81 continues ignition control by the normal ignition control unit 84 until a stop condition that is a condition for stopping the engine 20 is established.

As described above, (1) according to the present embodiment, the control unit 81 has the discharge control unit 82, the energy input control unit 83, the normal ignition control unit 84, and the specific ignition control unit 85.

The discharge control unit 82 controls the spark plug 40 so that the spark plug 40 generates electric discharge by controlling the igniter unit 60 to block the flow of current from the primary coil 51 towards the ground side, thereby causing a high voltage to be generated in the secondary coil 52. As a result, the spark plug 40 can generate electric discharge and ignite the air-fuel mixture.

The energy input control unit 83 controls the energy input unit 70 so as to input electrical energy to the ignition coil 50 after the start of control of the spark plug 40 by the discharge control unit 82. As a result, the discharge state of the spark plug 40 that occurs as a result of control by the discharge control unit 82 can be maintained.

The normal ignition control unit 84 controls ignition of the air-fuel mixture in the combustion chamber 28 only through control of the spark plug 40 by the discharge control unit 82.

The specific ignition control unit 85 controls ignition of the air-fuel mixture in the combustion chamber 28 through control of the spark plug 40 by the discharge control unit 82 and through control of the energy input unit 70 by the energy input control unit 83. When the specific ignition control unit 85 performs ignition control, the discharge state of the spark plug 40 can be maintained by the energy input control unit 83. Therefore, ignitability of the air-fuel mixture can be improved.

After the start-up condition that is the condition for starting the engine 20 is established, the control unit 81 performs ignition control by the specific ignition control unit 85 until the elapse of the first predetermined period Tp1 that is the first predetermined period. After the elapse of the first predetermined period Tp1, the control unit 81 switches to ignition control by the normal ignition control unit 84. Therefore, ignitability of the air-fuel mixture can be improved until a predetermined period (first predetermined period Tp1) has elapsed from the start-up of the engine 20. As a result, ignitability of the air-fuel mixture can be improved even in cases in which atomization of fuel is difficult, such as during low temperature immediately after start-up of the engine 20. Misfire and incomplete burning can be suppressed. Therefore, stopping of the engine 20 particularly immediately after start-up and worsening of emission can be suppressed.

In addition, according to the present embodiment, wait time is not required when ignition control by the specific ignition control unit 85 is performed. Therefore, the engine can be started at an early stage.

Furthermore, (2) according to the present embodiment, the energy input unit 70 inputs electrical energy to the ignition coil 50 from the ground side of the primary coil 51. The present embodiment gives an example of the configuration of the ignition apparatus 11 (energy input unit 70). According to the present embodiment, the ignition apparatus 11 includes a single ignition coil 50 for a single spark plug 40. The energy input unit 70 can maintain the discharge state occurring in the spark plug 40 over a predetermined period (energy input period, second predetermined period Tp2) by continuously inputting electrical energy to the ignition coil 50 from the ground side of the primary coil 51.

In addition, (3) according to the present embodiment, the control unit 81 sets the first predetermined period Tp1 based on the temperature of the coolant in the engine 20 and the voltage of the power supply 12. For example, the control unit 81 sets the first predetermined period Tp1 based on the temperature (water temperature) of the coolant detected by the water temperature sensor 15 and the voltage of the power supply 12 detected by the voltage sensor 18 when the start-up condition of the engine is established. For example, the control unit 81 sets the first predetermined period Tp1 to be a longer period as the detected water temperature decreases and the power supply voltage increases, and sets the first predetermined period Tp1 to be a shorter period as the detected water temperature increases and the power supply voltage decreases. Therefore, the period (first predetermined period Tp1) of ignition control by the specific ignition control unit 85 at engine start-up becomes longer as the water temperature decreases and the power supply voltage increases. As a result, ignitability of the air-fuel mixture can be improved even in cases in which atomization of fuel is difficult, such as during low temperature immediately after start-up of the engine 20. Misfire and incomplete burning can be further suppressed.

Furthermore, as a result of the period (first predetermined period Tp1) of ignition control by the specific ignition control unit 85 being shortened when the power supply voltage is low, consumption of electrical energy by the energy input unit 70 can be suppressed.

In addition, (4) according to the present embodiment, the energy input control unit 83 controls the energy input unit 70 so as to input electrical energy to the ignition coil 50 over the second predetermined period Tp2, which is the second predetermined period, after the start of control of the spark plug 40 by the discharge control unit 82. As a result of the second predetermined period Tp2 being set, the discharge state of the spark plug 40 can be maintained over a predetermined period (second predetermined period Tp2) even under circumstances in which the air-fuel mixture in the combustion chamber 28 is not easily ignited (ignited). Misfire and incomplete burning can be further suppressed.

Furthermore, (5) according to the present embodiment, the control unit 81 sets the second predetermined period Tp2 based on the temperature of the coolant in the engine 20 and the rotation speed of the engine 20. The control unit 81 sets the second predetermined period Tp2 based on, for example, the temperature (water temperature) of the coolant detected by the water temperature sensor 15 and the rotation speed (engine rotation speed) of the engine 20 calculated based on the rotation position of the crank shaft 29 detected by the crank position sensor 14, when the start-up condition for the engine 20 is established. For example, the control unit 81 sets the second predetermined period Tp2 to be a longer period as the detected water temperature decreases and the calculated engine rotation speed decreases, and sets the second predetermined period Tp2 to be a shorter period as the detected water temperature increases and the calculated engine rotation speed increases. Therefore, the input period (second predetermined period Tp2) of electrical energy to the ignition coil 50 by the energy input control unit 83 becomes longer as the water temperature decreases and the engine rotation speed decreases. Ignitability of the air-fuel mixture can be improved even in cases in which atomization of fuel is difficult, such as during low temperature immediately after start-up of the engine 20. Misfire and incomplete burning can be even further suppressed.

Moreover, (6) according to the present embodiment, the energy input control unit 83 controls the energy input unit 70 so that a current corresponding to the target current value IGa that is a predetermined current value flows through the secondary coil 52. Consequently, during the period over which the energy input unit 70 inputs electrical energy to the ignition coil 50, the secondary current I2 substantially corresponding to the target current value IGa flows to the secondary coil 52. As a result, the discharge state occurring the spark plug 40 can be stably maintained over a predetermined period (energy input period, second predetermined period Tp2).

Other Embodiments (7) According to another embodiment of the present invention, the control unit 81 may switch from ignition control by the specific ignition control unit 85 to ignition control by the normal ignition control unit 84 even before the elapse of the first predetermined period Tp1 after the start-up condition for the engine 20 has been established, should the temperature of the coolant in the engine 20 become a predetermined value or higher. In this case, switching to ignition control by the normal ignition control unit 84 can be performed without waiting for the elapse of the first predetermined period Tp1, when circumstances becomes such that the air-fuel mixture in the combustion chamber 28 is easily ignitable (ignitable), after the first predetermined period Tp1 has been set. Consequently, excessive consumption of electrical energy by the energy input unit 70 can be suppressed.

In addition, (8) according to another embodiment of the present invention, the control unit 81 may switch from ignition control by the specific ignition control unit 85 to ignition control by the normal ignition control unit 84 even before the elapse of the first predetermined period Tp1 after the start-up condition for the engine 20 has been established, should the voltage of the power supply 12 become a predetermined value or lower. In this case, when the voltage of the power supply 12 is low, the input of electrical energy to the ignition coil 50 by the energy input unit 70 can be stopped. As a result, in the case of a configuration in which the energy input unit 70 inputs electrical energy from the power supply 12 to the ignition coil 50, for example, decrease in voltage in the power supply 12 due to the input of electrical energy can be suppressed.

Furthermore, according to the above-described embodiment, an example is given in which the control apparatus is applied to an ignition apparatus that includes a single ignition coil for a single spark plug, and the energy input unit inputs electrical energy to the ignition coil from the ground side of the primary coil. Conversely, according to another embodiment of the present invention, the control apparatus can be applied to an ignition apparatus that, for example, includes a plurality of ignition coils for a single spark plug, and after discharge control of the spark plug, is capable of maintaining the discharge state of the spark plug by electrical energy being continuously inputted to the plurality of ignition coils by the energy input unit.

In addition, according to another embodiment of the present embodiment, the first predetermined period may be an arbitrary predetermined period, regardless of the temperature of the coolant in the internal combustion engine and the voltage of the power supply. Furthermore, the second predetermined period may be an arbitrary predetermined period, regardless of the temperature of the coolant in the internal combustion engine and the rotation speed of the internal combustion engine. In this case, for example, the process in which the first predetermined period and the second predetermined period are set when the start-up condition of the internal combustion engine is established can be omitted.

In addition, according to the above-described embodiment, an example is given in which the energy input control unit 83 controls the energy input unit 70 such that a current corresponding to the target current value IGa that is a predetermined current value flows through the secondary coil 52, by giving feedback of the value of the secondary current I2. Conversely, according to another embodiment of the present invention, the energy input control unit 83 may not give feedback of the value of the secondary current I2, and may not control the energy input unit 70 such that a current corresponding to the target current value IGa flows through the secondary coil 52.

Furthermore, according to another embodiment of the present invention, the energy input unit 70 may be configured to not include the capacitor 76. Even with the configuration in which the capacitor 76 is not included, electrical energy can be inputted to the ignition coil as a result of switching operation of the switching elements 72 and 73 being performed as appropriate.

In addition, according to another embodiment of the present invention, for example, the energy input unit may be a section that is capable of inputting electrical energy from a high-voltage power supply separate from the power supply 12, to the ignition coil. In this case, compared to the above-described configuration, the number of components configuring the energy input unit can be reduced.

Furthermore, according to another embodiment of the present invention, the switching element 61 of the igniter unit 60 is not limited to the IGBT, and may be configured by another semi-conductor switching element, such as a MOSFET or a transistor. Moreover, because the MOSFET generally has a parasitic diode, when the switching element 61 is configured by the MOSFET, the diode 62 can be omitted.

In addition, according to another embodiment of the present invention, the switching elements 72 and 73 of the energy input unit 70 is not limited to the MOSFET, and may be configured by another semi-conductor switching element, such as the IGBT or a transistor.

Furthermore, according to the above-described embodiment, an example is given in which the igniter unit 60 is housed in the housing of the ignition circuit unit 13. Conversely, according to another embodiment of the present invention, the igniter unit 60 may be provided near the ignition coil 50 without being housed in the housing of the ignition circuit unit 13.

In addition, according to the above-described embodiment, an example is given in which the current detection circuit 91 is housed in the housing of the ignition circuit unit 13. Conversely, according to another embodiment of the present invention, the current detection circuit 91 may be housed in the housing of the ECU 80. Alternatively, the control unit 81 of the ECU 80 may include the current detection circuit 91.

Furthermore, the control apparatus of the present invention can be applied to an ignition apparatus of an engine system that does not include the exhaust gas recirculation (EGR) system.

In addition, according to the above-described embodiment, an example is given in which the negative-direction secondary current flows to the secondary coil of the ignition coil during electric discharge of the spark plug. Conversely, according to another embodiment of the present invention, a configuration may be such that a positive-direction secondary current flows to the secondary coil of the ignition coil during electric discharge of the spark plug.

Furthermore, according to the above-described embodiment, an example is given in which the energy input unit inputs electrical energy to the ignition coil such that the negative-direction secondary current is superimposed. Conversely, according to another embodiment of the present invention, the energy input unit may be configured to input electrical energy to the ignition coil such that a positive-direction secondary current is superimposed.

In addition, the control apparatus of the present invention is not limited to the four-cylinder internal combustion engine and can also be applied to an ignition apparatus of an internal combustion engine of which the number of cylinders is other than four.

Furthermore, the control apparatus of the present invention is not limited to the internal combustion engine that includes a single ignition coil and spark plug for each cylinder, and can also be applied to an ignition apparatus of an internal combustion engine that includes a plurality of ignition coils or spark plugs for each cylinder.

In addition, the control apparatus of the present invention is not limited to the pre-mixed combustion-type internal combustion engine, and can also be applied to an ignition apparatus of a direct injection-type internal combustion engine.

Furthermore, according to another embodiment of the present invention, the energy input unit may be actualized in any manner as long as the energy input unit is capable of inputting energy that allows the ignition state to be maintained. A conventional multiple discharge method or a dual coil offset (DCO) method disclosed, for example, in JP-A-2012-167665 may be used. For example, when the DCO method is used, a coil power supply is controlled with an ignition coil, of the two ignition coils, that starts the main electric discharge as the ignition coil, and the ignition operation after the main electric discharge as the energy input unit. The secondary current may thereby be controlled, and ignition duration period may be controlled.

In this way, the present invention is not limited to the above-described embodiments and may be carried out according to various embodiments without departing from the spirit thereof.

REFERENCE SIGNS LIST

10 control apparatus
11 ignition apparatus
12 power supply
20 engine (internal combustion engine)
28 combustion chamber
40 spark plug
50 ignition coil
51 primary coil
52 secondary coil
60 igniter unit
70 energy input unit
81 control unit
82 discharge control unit (discharge control means)
83 energy input control unit (energy input control means)
84 normal ignition control unit (normal ignition control means)
85 specific ignition control unit (specific ignition control means)

What is claimed is:

1. A control apparatus that controls an ignition apparatus, the ignition apparatus including:
 a spark plug that is provided to a combustion chamber of an internal combustion engine and is capable of igniting the air-fuel mixture in the combustion chamber by generating electric discharge;
 an ignition coil that has a primary coil of which one end is connected to a power supply side and another end is connected to a ground side, and through which a primary current flows, and a secondary coil of which one end is connected to the spark plug and through which a secondary current flows;
 an igniter unit that is connected to a ground side of the primary coil and is provided to be capable of allowing or blocking the primary current flowing through the primary coil; and
 an energy input unit that is capable of inputting electrical energy to the ignition coil,
 the control apparatus being capable of controlling ignition of an air-fuel mixture in the combustion chamber,
 the control apparatus being characterized by comprising:
 a control unit that includes:
  a discharge control means for causing a high voltage to be generated in the secondary coil by controlling the igniter unit so as to block a flow of current from the primary coil towards the ground side, and controlling the spark plug so that electric discharge is formed between electrodes of the spark plug;
  an energy input control means for controlling the energy input unit to input electrical energy to the ignition coil after start of control of the spark plug by the discharge control means;
  a normal ignition control means for controlling ignition of the air-fuel mixture in the combustion chamber only through control of the spark plug by the discharge control means; and
  a specific ignition control means for controlling the ignition of the air-fuel mixture in the combustion chamber through control of the spark plug by the discharge control means and through control of the energy input unit by the energy input control means to input energy in a superimposed manner with a polarity that is the same as that of the secondary current,
 the control unit performing ignition control by the specific ignition control means by performing energy input by the energy input control means until a first predetermined period that is a first predetermined period elapses after a start-up condition that is a condition for starting the internal combustion engine is established, and switching to ignition control by the normal ignition control means after the elapse of the first predetermined period.

2. The control apparatus according to claim 1, wherein:
 the energy input unit inputs electrical energy to the ignition coil from the ground side of the primary coil.

3. The control apparatus according to claim 2, wherein:
the control unit sets the first predetermined period based on a temperature of a coolant in the internal combustion engine and a voltage of the power supply.

4. The control apparatus according to claim 3, wherein:
the energy input control means controls the energy input unit to input electrical energy to the ignition coil until a second predetermined period that is a second predetermined period elapses after the start of control of the spark plug by the discharge control means.

5. The control apparatus according to claim 4, wherein:
the control unit sets the second predetermined period based on the temperature of the coolant in the internal combustion engine and a rotation speed of the internal combustion engine.

6. The control apparatus according to claim 5, wherein:
the energy input control means controls the energy input unit so that a secondary current corresponding to a target current value that is a predetermined current value flows through the secondary coil.

7. The control apparatus according to claim 6, wherein:
the control unit switches from ignition control by the specific ignition control means to ignition control by the normal ignition control means when the temperature of the coolant in the internal combustion engine becomes a predetermined value or higher even before the elapse of the first predetermined period after the start-up condition is established.

8. The control apparatus according to claim 7, wherein:
the control unit switches from ignition control by the specific ignition control means to ignition control by the normal ignition control means when the voltage of the power supply becomes a predetermined value or lower even before the elapse of the first predetermined period after the start-up condition is established.

9. The control apparatus according to claim 1, wherein:
the control unit sets the first predetermined period based on a temperature of a coolant in the internal combustion engine and a voltage of the power supply.

10. The control apparatus according to claim 1, wherein:
the energy input control means controls the energy input unit to input electric energy to the ignition coil until a second predetermined period that is a second predetermined period elapses after the start of control of the spark plug by the discharge control means.

11. The control apparatus according to claim 1, wherein:
the energy input control means controls the energy input unit so that a secondary current corresponding to a target current value that is a predetermined current value flows through the secondary coil.

12. The control apparatus according to claim 1, wherein:
the control unit switches from ignition control by the specific ignition control means to ignition control by the normal ignition control means when the temperature of the coolant in the internal combustion engine becomes a predetermined value or higher even before the elapse of the first predetermined period after the start-up condition is established.

13. The control apparatus according to claim 1, wherein:
the control unit switches from ignition control by the specific ignition control means to ignition control by the normal ignition control means when the voltage of the power supply becomes a predetermined value or lower even before the elapse of the first predetermined period after the start-up condition is established.

14. A control method for controlling an ignition apparatus, the ignition apparatus including:
a spark plug that is provided to a combustion chamber of an internal combustion engine and is capable of igniting the air-fuel mixture in the combustion chamber by generating electric discharge;
an ignition coil that has a primary coil of which one end is connected to a power supply side and another end is connected to a ground side, and through which a primary current flows, and a secondary coil of which one end is connected to the spark plug and through which a secondary current flows;
an igniter unit that is connected to a ground side of the primary coil and is provided to be capable of allowing or blocking the primary current flowing through the primary coil; and
an energy input unit that is capable of inputting electrical energy to the ignition coil,
the control method controlling ignition of an air-fuel mixture in the combustion chamber,
the control method comprising:
causing, by a discharge control means of a control unit, high voltage to be generated in the secondary coil by controlling the igniter unit so as to block a flow of current from the primary coil towards the ground side, and controlling the spark plug so that electric discharge is formed between electrodes of the spark plug;
controlling, by an energy input control means of the control unit, the energy input unit to input electrical energy to the ignition coil after start of control of the spark plug by the discharge control means;
controlling, by a normal ignition control means of the control unit, ignition of the air-fuel mixture in the combustion chamber only through control of the spark plug by the discharge control means;
controlling, by a specific ignition control means of the control unit, the ignition of the air-fuel mixture in the combustion chamber through control of the spark plug by the discharge control means and through control of the energy input unit by the energy input control means to input energy in a superimposed manner with a polarity that is the same as that of the secondary current; and
performing, by the control unit, ignition control by the specific ignition control means by performing energy input by the energy input control means until a first predetermined period that is a first predetermined period elapses after a start-up condition that is a condition for starting the internal combustion engine is established, and switching to ignition control by the normal ignition control means after the elapse of the first predetermined period.

* * * * *